(12) United States Patent
Litvin et al.

(10) Patent No.: US 8,391,600 B2
(45) Date of Patent: Mar. 5, 2013

(54) HISTOGRAM-BASED COMPOUND OBJECT SEPARATION

(75) Inventors: Andrew Litvin, Wakefield, MA (US); Sergey Simanovsky, Brookline, MA (US); Ram Naidu, Newton, MA (US)

(73) Assignee: Analogic Corporation, Peabody, MA (US)

(*) Notice: Subject to any disclaimer, the term of this patent is extended or adjusted under 35 U.S.C. 154(b) by 1068 days.

(21) Appl. No.: 12/357,035

(22) Filed: Jan. 21, 2009

(65) Prior Publication Data

US 2010/0183209 A1    Jul. 22, 2010

(51) Int. Cl.
G06K 9/00    (2006.01)
G06K 9/34    (2006.01)

(52) U.S. Cl. ........................... 382/168; 382/154

(58) Field of Classification Search .......... 382/128–132, 382/145, 149, 168, 170–173, 181, 285; 345/419, 345/582, 589; 436/173; 250/281
See application file for complete search history.

(56) References Cited

U.S. PATENT DOCUMENTS

| | | | | |
|---|---|---|---|---|
| 7,065,239 B2* | 6/2006 | Maayah et al. | ............... | 382/145 |
| 7,194,117 B2* | 3/2007 | Kaufman et al. | ............... | 382/128 |
| 7,499,578 B2* | 3/2009 | Reeves et al. | ............... | 382/131 |
| 7,574,046 B2* | 8/2009 | Ichimura et al. | ............... | 382/181 |
| 7,894,650 B2* | 2/2011 | Weng et al. | ............... | 382/128 |
| 2009/0279778 A1* | 11/2009 | Ekin | ............... | 382/170 |
| 2010/0183209 A1* | 7/2010 | Litvin et al. | ............... | 382/131 |

OTHER PUBLICATIONS

Parzen, "On Estimation of a Probability Density Function and Mode", *Stanford Universtiy, The Annals of Mathematical Statistics*, pp. 1065-1076, 2000.
Roover et al., "Smoothing with Active Surfaces: A Multipurpose Level Set Approach", *IEEE Computer Society*, pp. 1-4, 2006.
Samet, "Connected Component Labeling Using Quadtrees", *Journal of the Association for Computing Machinery*, vol. 28, No. 3, pp. 487-501, 2004.

* cited by examiner

*Primary Examiner* — Amir Alavi
(74) *Attorney, Agent, or Firm* — McDermott Will & Emery LLP (57) ABSTRACT

Certain imaging systems, such as automatic explosives detection systems, employ techniques that utilize image processing, feature extraction and decision making steps to detect threats in images. Such techniques use segmentation as a first algorithmic step, which extracts data representing objects from image data. Some of the extracted objects are actually composed of multiple distinct physical objects. For these compound objects discrimination becomes difficult because computed object properties are less specific than properties computed for a single physical object. A technique is described which includes splitting such compound objects by separating the data of each component from the rest of the data and using properties of density histograms based on voxel distributions in both density and spatial domains.

26 Claims, 12 Drawing Sheets

HISTOGRAM-BASED COMPOUND OBJECT SEPARATION

FIELD

The present disclosure relates to volumetric imaging devices, and more particularly to volumetric imaging devices using a threat detection system based on object segmentation.

BACKGROUND

Volumetric imaging devices such as CT scanners are often used to recognize or detect particular objects of interest. For example, when using security scanners, objects of interest usually include threat materials, while in a medical setting objects of interest might be pathological tissue, such as cancer cells. The imaging device typically uses a segmentation algorithm to extract object representations from images. In a security scanner setting, a segmented object defines a collection of voxels for a detected luggage item. The properties of the segmented object are then extracted and used by the discrimination framework to identify threats. During segmentation, sometimes more than one object in the image may be grouped together and appear as a single object known as a compound object.

A compound object can be made up of two or more distinct items. Because the compound object actually comprises separate physical objects, properties of the compound object may not be able to be effectively compared with those of known threat and/or non-threat items. As such, for example, luggage containing a compound object may unnecessarily be flagged for additional (hands-on) inspection because the properties of the compound object resemble properties of a known threat object. Alternatively, a compound object that should be flagged as a threat may not be so identified because properties of a potential threat object in the compound object are diluted by the properties of one or more other (non-threat) objects in the compound object, and these diluted properties (of the compound object) more closely resemble those of a non-threat object than those of a threat object.

SUMMARY

Compound object splitting can be applied to objects in an attempt to improve threat item detection, and thereby increase the throughput and effectiveness at a security check-point. Compound object splitting essentially identifies potential compound objects and splits them into sub-objects. Splitting of compound objects comprising components with different densities can be performed using a histogram-based compound object splitting technique disclosed herein.

In accordance with one aspect, a method of identifying sub-objects of an object defined as a plurality of volume elements (voxels) in volumetric imaging system data is described, wherein each voxel is associated with a feature value (F). The method comprises: a. determining a distribution of F values of object voxels so as to define an F distribution; b. identifying peaks and separation thresholds within the F distribution; c. deciding whether an object is a potential compound object; d. based on the separation thresholds, for each object voxel, assigning a sub-object label corresponding to the feature value associated with each voxel so as to distinguish the voxels for each of the sub-objects; and e. refining the sub-object label assignment so as to resolve inconsistencies in sub-object boundaries.

In accordance with another aspect, a system for identifying sub-objects of an object defined as a plurality of volume elements (voxels) in volumetric imaging data is also described, wherein each voxel is associated with a feature value (F). The system comprises: a processor subsystem configured to analyze the volumetric imaging data so as to identify any sub-objects of an object by analyzing the distribution of the feature value F of the object voxels, initially label any sub-objects based upon the analysis, and further refine the labeling of the sub-objects so as to resolve any inconsistencies in the sub-object boundaries.

In accordance with yet another aspect, a computer-readable medium is disclosed. The medium contains computer executable instructions for performing the steps of: determining a distribution of feature values of object voxels so as to define an F distribution; assigning a sub-object label to each object voxel based on the separation thresholds corresponding to the F value associated with each voxel in the F distribution so as to distinguish the voxels for each of the sub-objects; and refining the sub-object label assignment so as to resolve inconsistencies in sub-object boundaries.

BRIEF DESCRIPTION OF THE DRAWINGS

FIG. 9 illustrates an example of the image data and resulting labeled object representation produced by the splitting step, with FIG. 9A showing one object enveloped in another.

DETAILED DESCRIPTION OF THE DRAWINGS

Figure 1:
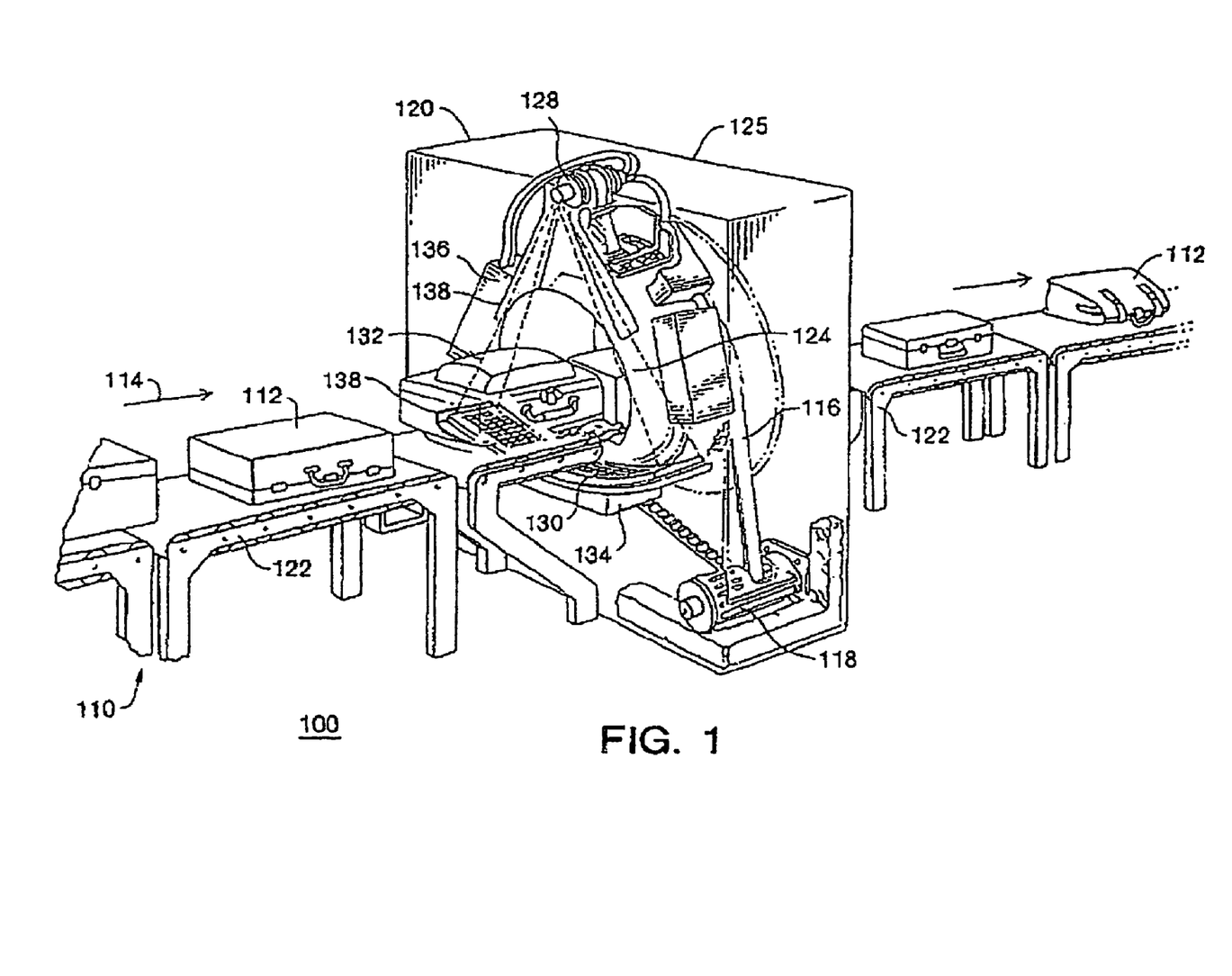
FIG. 1 is a perspective view of a baggage scanning system including a rotating gantry with mounted X-ray source and X-ray detector, and a baggage conveyor system, which can be adapted to incorporate the system and perform method described herein.

Referring to the drawings, in FIG. 1 one embodiment of a baggage scanning system is shown as a CT scanner, incorporating an X-ray source 128, X-ray detector 130, mounted on the disk 124 disposed within a gantry support 125 for rotation about a rotation axis that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the present assignee and, which is incorporated herein in its entirety by reference. The baggage scanning system 100 includes a conveyor system 110 for continuously conveying baggage or luggage 112 in a direction indicated by arrow 114 through a central aperture of a CT scanning system 120. The conveyor system includes motor driven belts for supporting the baggage. The system 120 is also preferably provided with a computerized system (not shown) for processing the output of the data acquisition system 134 and for generating the necessary signals for operating and controlling the system 120. The computerized system can also include a monitor for displaying information including generated images. While illustrated as a CT system, those of ordinary skill in the art will understand that other implementations such as line scanners are also contemplated.

Figure 2:
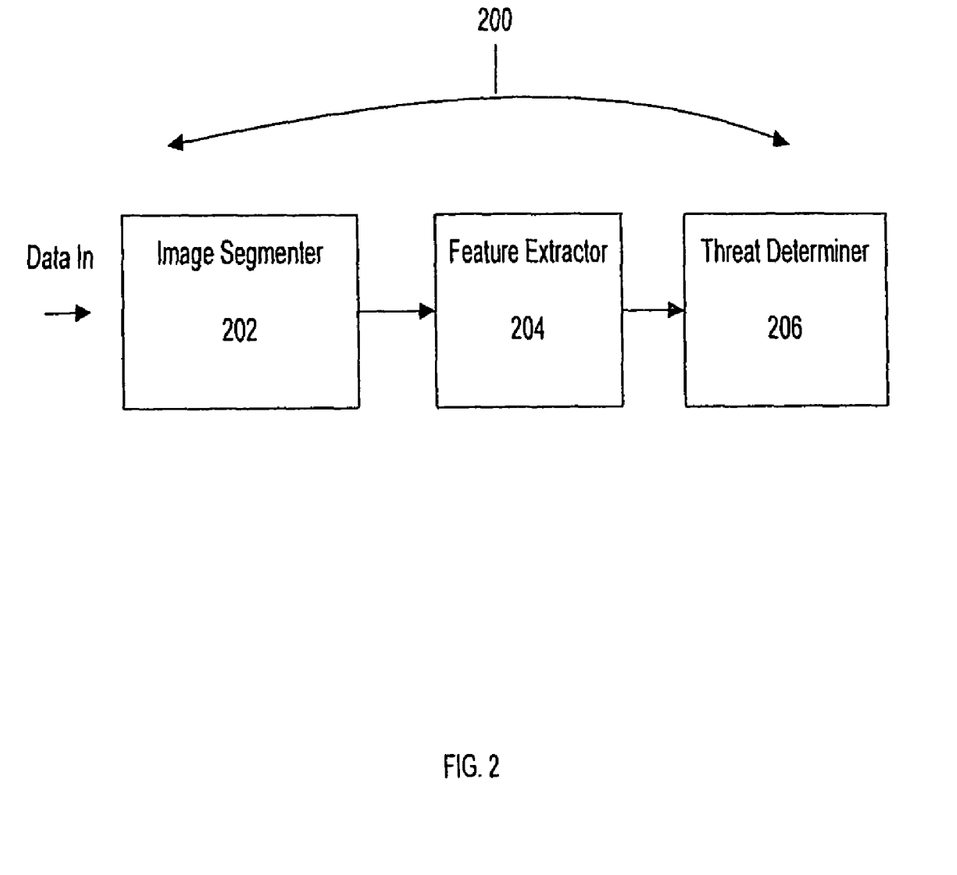
FIG. 2 illustrates one embodiment of a technique of splitting compound objects.

One embodiment of the scanning system, illustrated in FIG. 2 also includes the threat detection computerized system 200 shown in FIG. 2 comprising an image segmenter 202, a feature extractor 204 and a threat determiner 206. The image segmenter 202 is configured to segment objects as pluralities of voxels from volumetric images. The feature extractor 204 is configured to extract features (such as mass or volume) from object representation. The threat determiner 206 can be configured to compare feature data to one or more pre-determined thresholds, corresponding to one or more potential threat objects. It will be appreciated that the systems and techniques provided herein are not limited to utilizing a threat determiner, and may be utilized for separating compound objects without a threat determiner.

The design of the image segmenter 202 is such that in some circumstances (for instance due to image artifacts) it may segment an object comprising two or more distinct physical objects. For example, if two items of similar density are lying side by side and/or touching each other, a security scanner system may extract the two items as one single compound object. Because the compound object actually comprises at least two separate objects, however, properties of the compound object may not be able to be effectively compared with those of known threat and/or non-threat items inhibiting threat determiner performance. In order to enhance threat detection and visualization, it is necessary to reduce the occurrence of the compound objects. The employed techniques preferably include a method of histogram-based compound object splitting.

The Histogram-based Compound Object Splitting technique targets compound objects which are composed of two or more objects with different mean feature values. Histogram-based Compound Object Splitting technique analyzes voxel feature value histograms to detect the presence of non-overlapping feature distribution modes. If a plurality of modes is detected, the object is identified as being potentially compound and Histogram-based Compound Object Splitting separates the compound object into multiple sub-objects corresponding to distinct physical objects.

The voxel feature value embodiment depends on the imaging system technology. For CT systems, the voxel feature value can be a CT number. While in the following description the CT number is used to refer to the voxel feature value, those skilled in the art may utilize a different embodiment for the voxel feature value, such as atomic number, density, etc.

Figure 3:
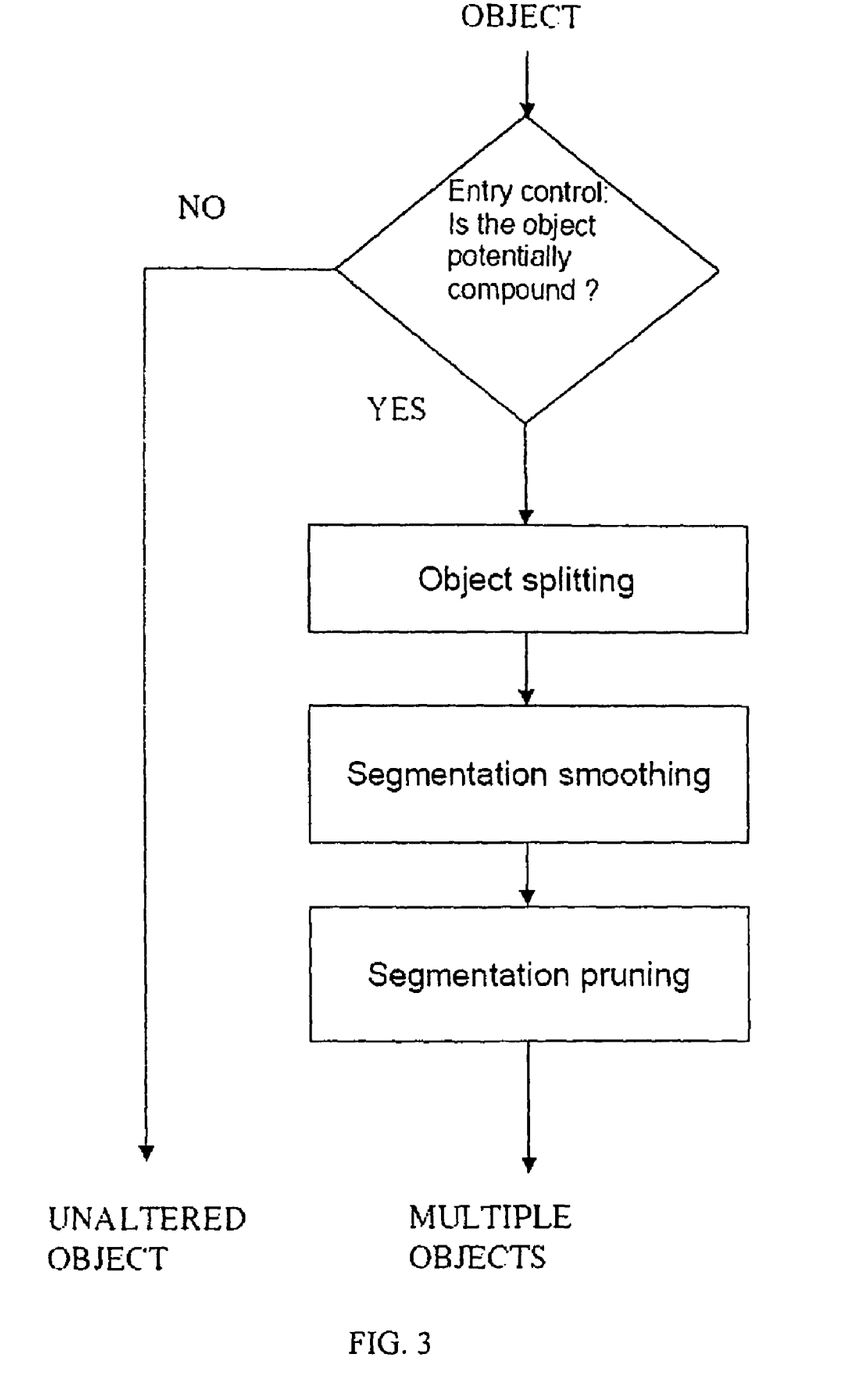
FIG. 3 is a flow chart showing the steps carried out when using the embodiment of FIG. 2.

One embodiment of the technique of splitting compound objects, illustrated in FIG. 3 includes the following components, all described in greater detail below.
  1. Entry control component 302. The entry control component identifies whether the object is potentially compound. If the object is identified to be potentially compound, the object is subject to analysis by the following three components.
  2. Object splitter 304.
  3. Segmentation smoother 306.
  4. Segmentation pruner 308.

Figure 4A:
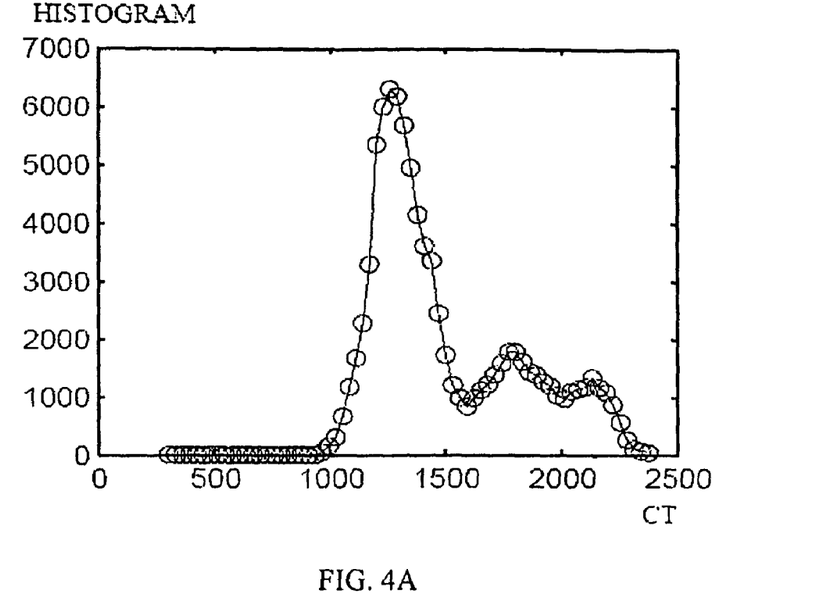
FIGS. 4A and 4B is an illustrated example of the peak merging step.

In one embodiment, the entry control component 302 comprises the histogram analyzer, which computes the voxel histogram, illustrated by way of example in FIG. 4A at 402. Peaks 404, 406 and 408 and valleys 410 and 412 of the histogram are detected. The properties of the peaks are computed. Significant peaks of the histogram are detected, illustrated by way of example in FIG. 4B. A decision to split the object is made if the object histogram contains two or more significant histogram peaks. For example, in FIG. 4B, the histogram 414 is split into three sub-objects. Significance of the peak is defined based on the peak properties. If the object is selected for splitting, an object specific CT number splitting threshold(s) is computed.

In another embodiment, the object splitter 304 (of FIG. 3) thresholds the image using the threshold(s) computed by the entry control component 302. The object is split into sub-objects, where the number of sub-objects is equal to the number of detected significant histogram peaks.

In yet another embodiment, the segmentation smoother 306, dissolves mislabeled small patches and mislabeled object boundaries into the dominant sub-object, based on a local neighborhood analysis. Alternatively, segmentation smoothing can be carried out using a surface evolution algorithm such as described in Roover, C. and Czyz, J. and Macq, B, *Smoothing with Active Surfaces: A Multiphase Level Set Approach*, International Conference on Pattern recognition, pp. 243-246, 2006.

In still another embodiment, the segmentation pruner 308 performs the following tasks. Small sub-objects are eliminated. Connectivity analysis is performed. Sub-objects that are substantially connected to one another are merged. Remaining sub-objects are classified as new objects returned by the algorithm.

The following describes a more detailed embodiment of the system for and technique of splitting compound objects as previously described in connection with FIG. 3.

The entry control component performs as follows. The CT number histogram is computed by dividing the plurality of possible CT number values into bins of equal width and counting the number of voxels having the CT number within the bin boundaries for each bin, such as shown by way of example at each point of the curve shown in FIG. 4A. Those skilled in the art can utilize a different approach to compute feature distributions, such a kernel density estimator approach as described in Parzen E. *On estimation of a probability density function and mode*, Ann Math. Stat. 33, pp. 1065-1076, 1962.

Figure 4B:
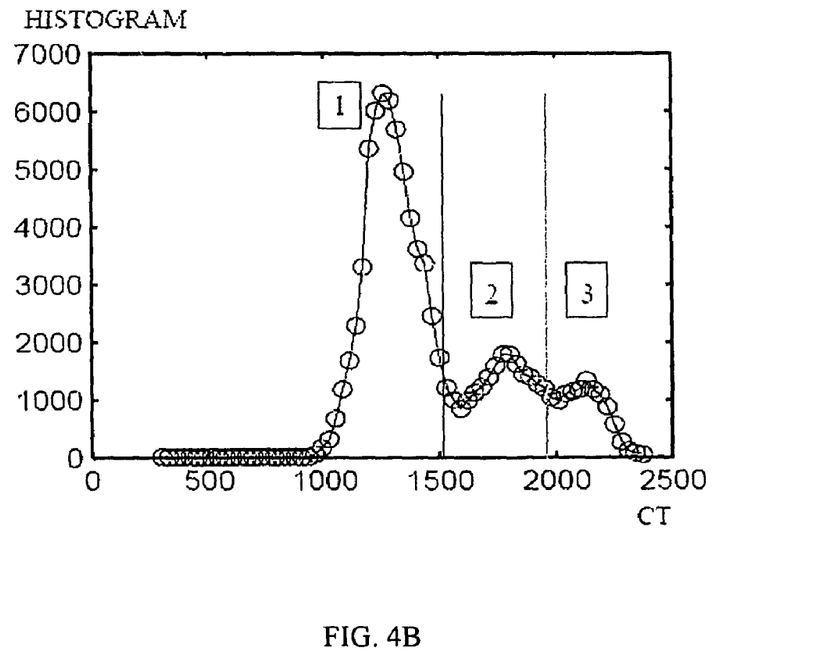

Referring to an example shown in FIGS. 4A and 4B, the CT number histogram is analyzed for peaks (for example FIG. 4A shows three peaks 404, 406 and 412) to determine if the object is a candidate for splitting. First, peak relative height and separation are used to remove insignificant peaks from the histogram. The significant peaks 404, 406 and 412 are extracted from the smoothed histogram (FIG. 4B shows three peaks 1, 2 and 3). The object is determined to be potential compound if there are at least two significant peaks. If the object is determined to be potential compound object, CT number thresholds for object splitting are determined.

Figure 5:
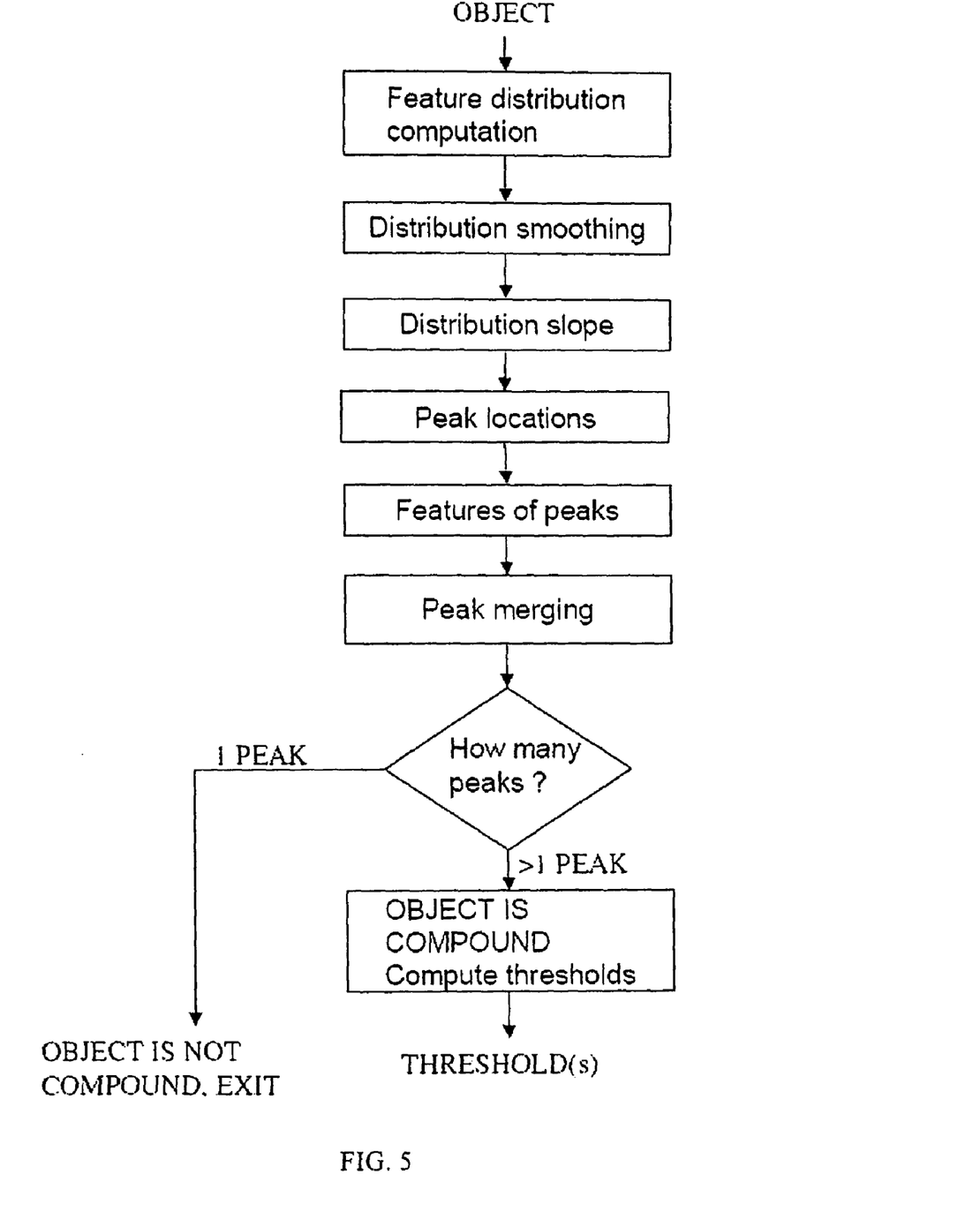
FIG. 5 is a flow chart showing the steps of an embodiment of the entry control step to make an initial determination of whether an object is compound.

An embodiment of the algorithm used to carry out the foregoing steps is now described with assistance by referring to FIG. 5. First, at step 502, the feature distribution (such as a histogram) is computed. The histogram is then filtered at 504. The slope of the smoothed histogram is found at step 506. At step 508 the peaks of the histogram are identified as local maxima of the histogram slope. For each of the identified peaks, a set of features are computed at 510. The features, for example, can include peak width and peak height. The features are used to compute a distinctiveness score for each peak. In one embodiment, the distinctiveness score can be computed as a ratio of peak height to the height of the valley adjacent to the peak. Because each peak has two adjacent valleys, the distinctiveness score for each peak is computed separately for the right side valley and for the left side valley.

The peak merging step 512 is performed to eliminate and merge insignificant peaks. Consider a pair of adjacent peaks. Peaks are sequentially analyzed from left to right, verifying prominence of the right side valley for each peak. If the current peak does not satisfy the condition on right side distinctiveness score, the current peak is not prominent on the right side. The adjacent peak on the right side is then merged into the current peak. Since peak properties change during the merge process, each newly created peak must be analyzed. The condition of the distinctiveness score, for example, may compare the score to a threshold. For example, a threshold for distinctiveness score may be determined by testing a variety of objects by subjecting them to similar scanning and compound object splitting. In another example, a distinctiveness score threshold may be calculated based on certain variables associated with the system. It will be appreciated that the systems and techniques, described herein, are not limited to determining a distinctiveness score threshold in any particular manner. Those skilled in the art may devise alternate methods for determining a distinctiveness score threshold.

Figure 6A:
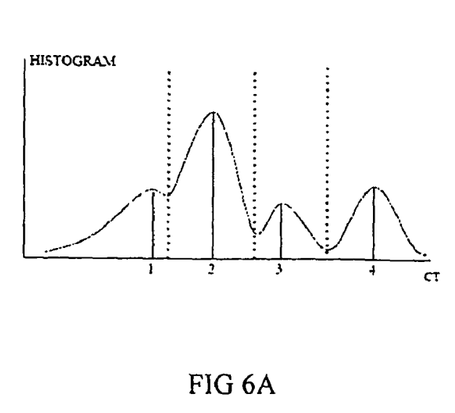
FIGS. 6A-6D illustrate an example of peak merging which forms a part of the disclosed embodiment of the histogram-based compound object splitting technique, with FIG. 6A illustrating initial peak and valley locations, FIG. 6B illustrating peak analysis in one direction, FIG. 6C illustrating peak analysis in the opposite direction, and FIG. 6D illustrating the resulting histogram peaks

FIGS. 6A-6D illustrate an embodiment of the current step of the merging process and resulting peaks and valleys. FIG. 6A shows a typical histogram distribution.

Figure 6B:
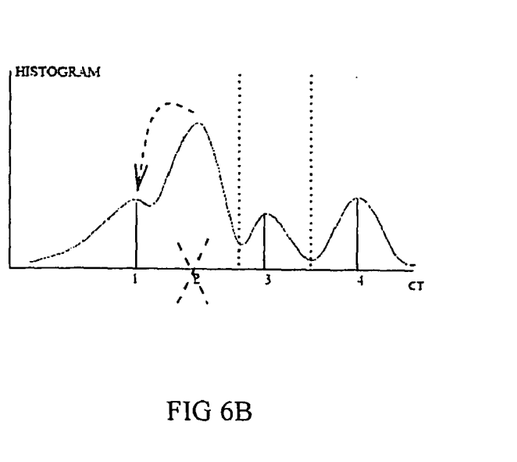

Peaks 602, 604, 606 and 608 are sequentially analyzed from right to left as illustrated in FIG. 6B, verifying prominence of the left side valley for each peak. If the current peak does not satisfy the condition on left side distinctiveness score, current peak is not prominent on the left side. The adjacent peak on the left side is merged into the current peak. Since peak properties change during the merge process, each newly created peak must be analyzed. In FIG. 6B, peak 1 is merged into the peak 2 and resulting peaks are renumbered.

Figure 6C:
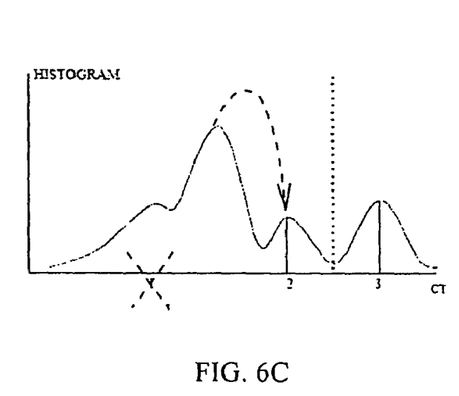

FIG. 6C illustrates the current step of the merging process and resulting peaks and valleys. Peaks 1, 2, 3 are sequentially analyzed from left to right as illustrated in FIG. 6C, verifying prominence of the right side valley for each peak. If the current peak does not satisfy the condition on right side distinctiveness score, current peak is not prominent on the right side. The adjacent peak on the right side is merged into the current peak. Since peak properties change during the merge process, each newly created peak must be analyzed. In FIG. 6C, peak 2 is merged into the peak 1 and resulting peaks are renumbered.

Figure 6D:
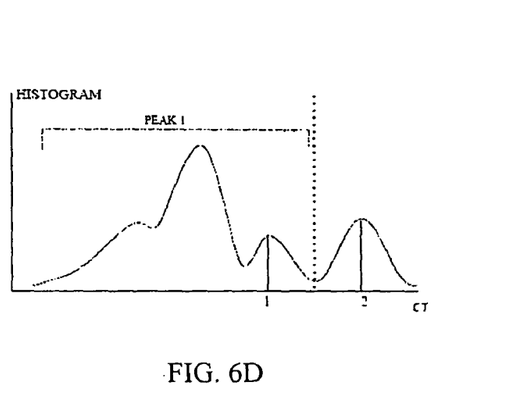

FIG. 6D illustrates the final detected significant peaks. Note that the new peak 1 encompasses original peaks 602, 604 and 606. Note that at the end of the current step, the number of peaks is the final number of significant peaks detected in the histogram, as illustrated in FIG. 6D.

Referring again to FIG. 5, at step 514, the decision to split the object is made. The algorithm proceeds to the next step 516 if the number of significant peaks is greater than 1. Otherwise, the Histogram-based Compound Object Splitting technique is terminated for the current object and the object is not split.

In an example, the splitting threshold for a pair of peaks is defined as CT value used to classify the voxels into sub-objects. For each pair of adjacent peaks the splitting threshold is computed using the properties of the peaks. For example, the value of the splitting threshold can be computed as the middle between adjacent peak locations.

Furthermore, the splitting threshold can be refined using other peak properties, such as height in order to produce better splitting results. For example, a correction term can be determined by testing a variety of objects by subjecting them to similar scanning and compound object splitting. In another example, a correction term may be calculated based on certain variables associated with the system. It will be appreciated that the systems and techniques, described herein, are not limited to determining a correction term (K) in any particular manner. Alternate methods for determining a correction term can be devised.

Figure 7:
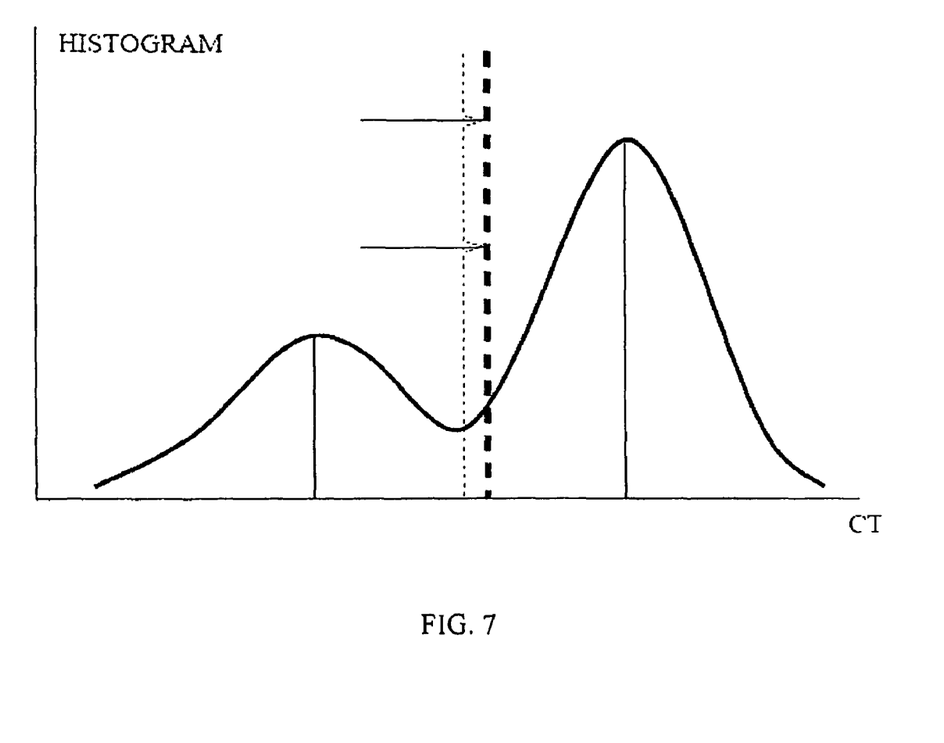
FIG. 7 illustrates an example of a shift in the splitting threshold towards the dominant peak.

The action of the correction term is illustrated by the example shown in FIG. 7. In the absence of correction term K, the calculated threshold value (thin dashed line 702) is in the middle between peak locations. The correction term is used to shift the threshold (bold dashed line 704) towards the larger peak.

Figure 8:
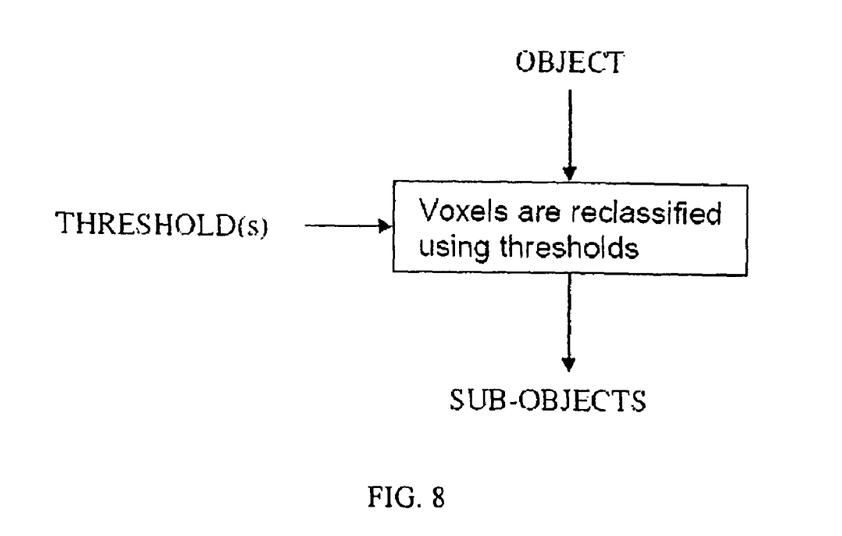
FIG. 8 is a flow chart of an embodiment of object splitting as a part of the histogram-based compound object splitting technique.

The next component of object splitting, the object splitter 304 of FIG. 3, will now be explained with reference to the exemplified embodiment of FIG. 8. At this stage, as shown in FIG. 8, at step 802 the original object voxels are classified into two or more sub-objects, using splitting thresholds determined previously.

Figure 9A:
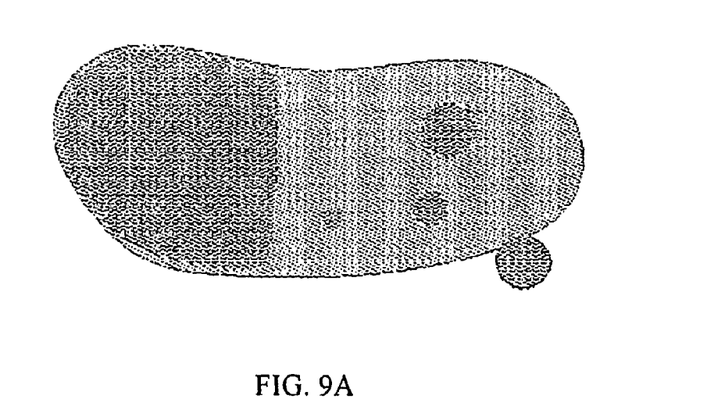
Figure 9B:
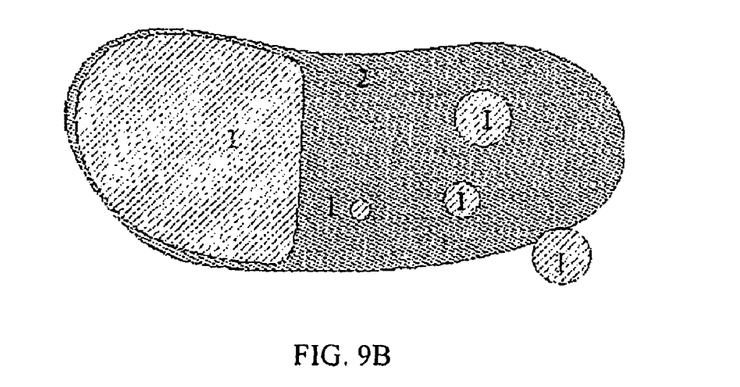
FIG. 9B showing the labeled object representation produced by the object splitter

In one embodiment, for each detected significant peak of the histogram, a sub-object (collection of object voxels denoted as $\Omega_i$) is formed so that it includes all the voxels with CT numbers between splitting thresholds surrounding the peak. The object splitting is illustrated in FIGS. 9A and 9B. The next component of the illustrated embodiment, the segmentation smoother, will now be explained.

Referring to FIGS. 9A and 9B, the object splitting performed at the previous step does have certain limitations. First, due to noise and artifacts, voxels whose CT numbers are close to the threshold can be misclassified, resulting in mutually interleaved single voxels and small patches such as shown at 902 in FIG. 9A. As a result, new objects include disconnected parts. These disconnected misclassified parts at 902 must be merged into the surrounding object as shown in FIG. 13D. Second, due to partial volume effect, the boundary layer of voxels, indicated at 904, for the object always has lower CT numbers than the voxels inside the object. Assume for example that the compound object to be split includes only two physical objects with low and high CT numbers respectively. Due to partial volume effects, boundary voxels of the high CT number object are likely to be classified as belonging to the low CT number object such as shown at FIG. 9A. Third, an object with a thin shell having high density (such as liquid in a can or a bottle), will have the boundary voxels classified as the high CT number object, similar to 904 in FIG. 9A. Such misclassified boundary voxel layers must be merged into the correct object as shown in FIG. 13D.

In order to address the above limitations two goals should be achieved. First, small voxel patches must be merged into the surrounding object and second, thin layers must be merged into the dominant object (adjacent to the thin layer) as can be seen in FIG. 13D. In order to simultaneously meet these two goals, a surface evolution approach is proposed. Our approach is based on the concept of distance function (or grass-fire transform as described in Blum, H., *A transformation for extracting new descriptors of shape*, MIT press, Cambridge, Mass., pp. 362-380, 1967, which disclosure is incorporated herein by reference). The surface evolution approach is designed to evolve the interface between the sub-objects in the direction of the thinner object.

Figure 10:
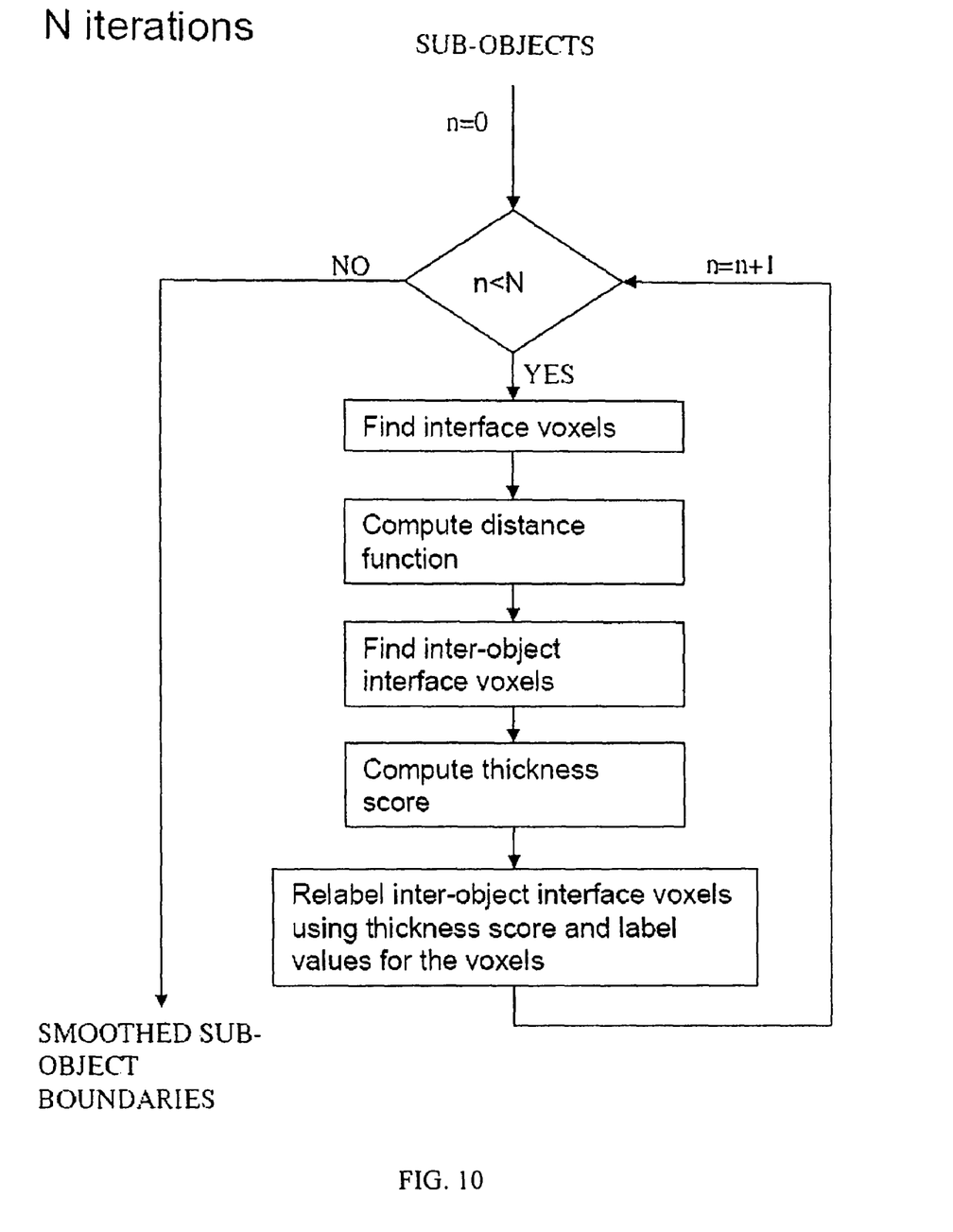
FIG. 10 is a flow chart of an embodiment of segmentation smoothing as a part of the histogram-based compound object splitting technique.

As best shown in the example illustrated by the flow chart in FIG. 10, the algorithm proceeds through the specified number of iterations. The iteration counter n is initially set to 0. So long as n is less than N, the algorithm will proceed at step 1002 with interface evolution starting with the first step of the algorithm 1004 that finds the interface voxels.

The sequence of steps for one iteration of the algorithm reclassifies the single layer of boundary voxels. In order to absorb the layer of maximum $N_v$ voxels, the surface evolution must be repeated at least $N_v$ times. Hence, it is recommended that $N \geq N_v$.

Figure 11A:
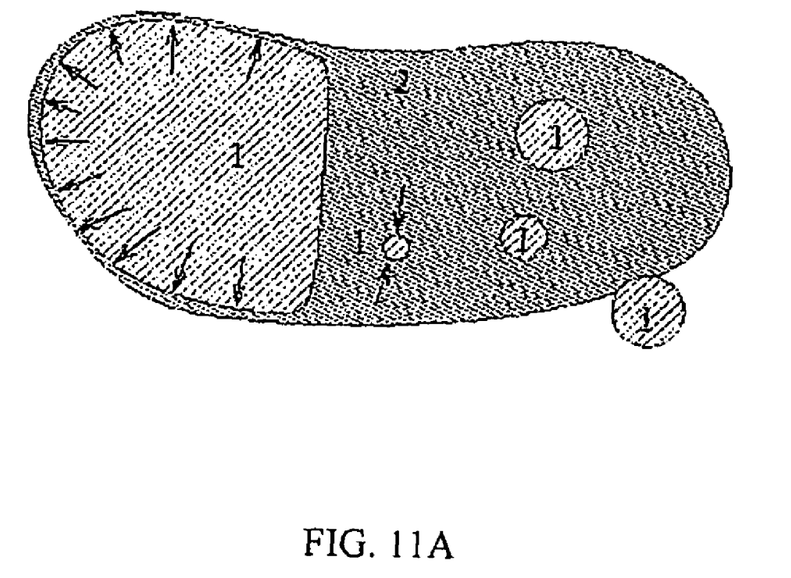
FIGS. 11A and 11B illustrate an example of the desired action of the segmentation smoothing on the image data, with FIG. 11A illustrating desired direction of motion of sub-object boundaries and FIG. 11B showing the desired final effect of the segmentation smoothing step.

The detailed description of one iteration of the algorithm includes the following steps. At step 1004, the set of interface voxels is defined. For example, interface voxels are found as voxels having neighboring voxels belonging to at least two different sub-objects or to a sub-object and air. See for example the arrows shown at 1102 in the image illustrated in FIG. 11. In addition, each voxel is assigned an initial value of the "distance function". Interface voxels are assigned the distance function value of 1, and other voxels are assigned the distance function value of 0.

At step 1006, one or more layers of the distance function are iteratively computed. The first layer of the distance function includes voxels of the interface between different sub-objects. The distance function value for the first layer is equal to zero. Each subsequent layer of the distance function includes voxels having at least one neighbor belonging to the previous layer. Let the computed number of layers of the distance function be denoted M. The voxels for each layer j∈[1..M] are assigned the distance function value equal to the layer index j.

At step 1008, the subset of interface voxels that have neighboring voxels belonging to at least two different sub-objects is found.

At step 1010, for each voxel in the set found at 1008, a thickness score is computed. For example a thickness score S can be computed as the normalized neighborhood sum of the voxel label values weighted by the distance function.

$$S = \frac{\sum_{i \in \Omega} D_i L_i}{\sum_{i \in \Omega} D_i}$$

where
Ω—the neighborhood for the voxel
$D_i$—the distance function value for the voxel i
$L_i$—the label value for the voxel i
Thin layers of voxels have smaller values of the distance function; hence, the computed score will be closer to the label value of the thicker layer.

At step 1012, the inter-object interface voxels are examined. If the thickness score for a given voxel is closer to the label value of the neighboring voxel, the voxel is relabeled using the label value of the neighboring voxel. It will be appreciated that, while the embodiment described above show the embodiment of the segmentation smoothing component using distance function concept, those skilled in the art may devise alternate arrangements for this component in a system. For example, the segmentation smoother may perform low-pass filtering of the label image.

Figure 11B:
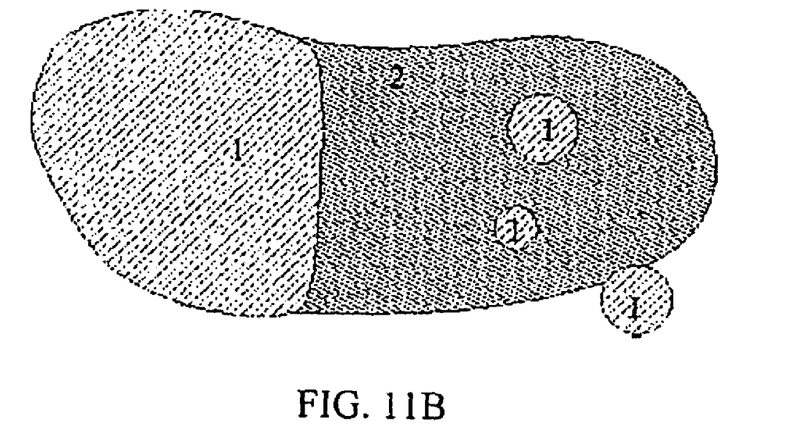

The object representation produced by the segmentation smoother is illustrated in FIG. 11. The segmentation smoother is applied to the object representation in FIG. 9B. FIG. 11A illustrates the direction of evolution of the inter-object interfaces. FIG. 11B illustrates the resulting representation of object components.

In another aspect, undesirable separation may not be fully corrected by the segmentation smoother when sub-object data generated by the segmentation smoother includes unconnected voxel patches as illustrated in FIG. 11B. In one embodiment, these unconnected voxel patches need to be merged into bigger sub-objects to which they are attached, for example, so that sub-objects correspond to physically distinct objects in the image.

Figure 12:
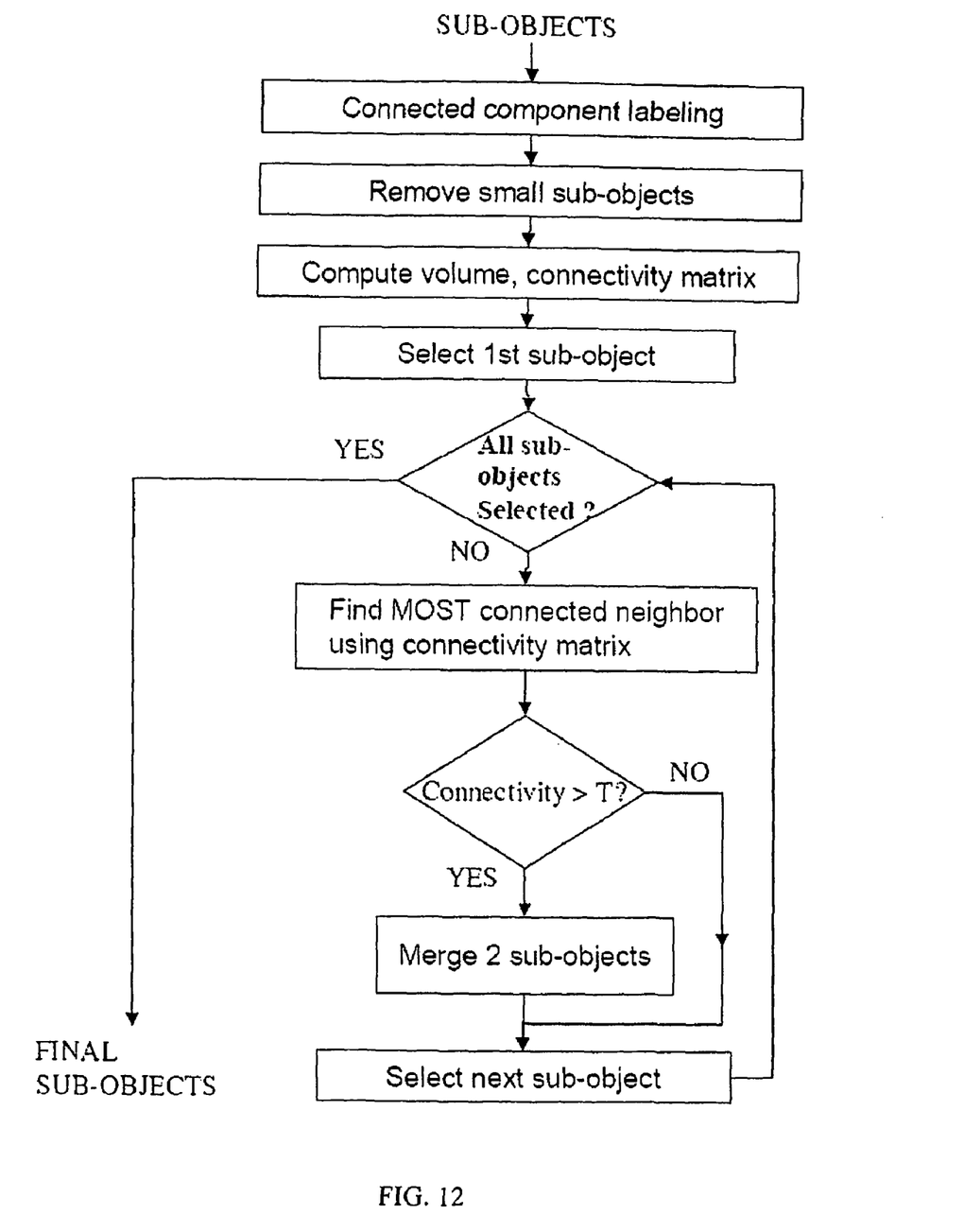
FIG. 12 illustrates flow chart of an embodiment of segmentation pruning as a part of the histogram-based compound splitting technique.
Figure 13A:
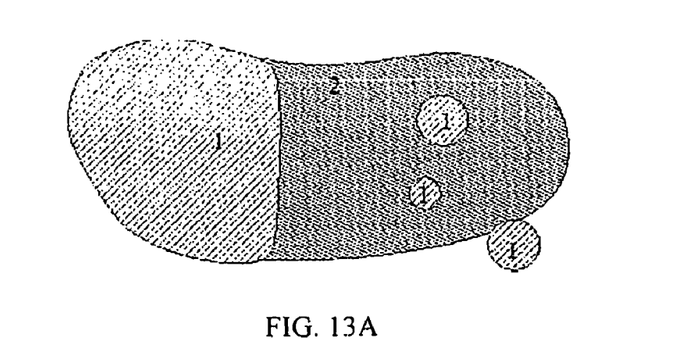
FIGS. 13A-D illustrate an example of the segmentation pruning on the image data, with FIG. 13A illustrating the labeled object representation produced by the segmentation smoothing step, FIG. 13B illustrating the labeled object representation produced by the connected component labeling step, FIG. 13C illustrating the labeled object representation produced after removing small sub-objects, and FIG. 13D illustrating the labeled object representation produced by the connectivity analysis step.
Figure 13B:
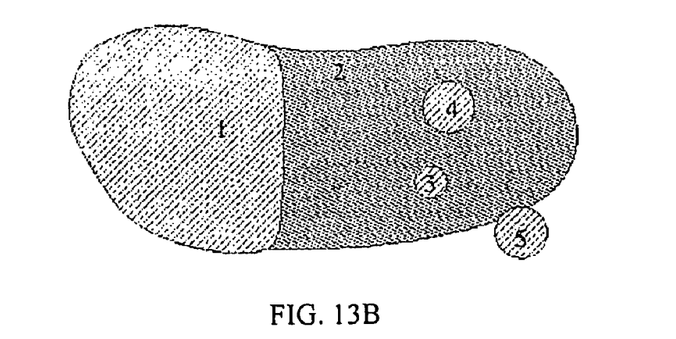

In one embodiment, a segmentation pruner 308 (in FIG. 3) is configured to identify disconnected voxel patches and dissolve the disconnected voxel patches into the dominant sub-object. One embodiment of the segmentation pruner is illustrated in FIG. 12 at 1200, and includes the following steps:

At step 1202, connectivity analysis of the sub-object data illustrated in FIG. 13A is performed, assigning each disconnected voxel group a separate label value, for example using a CCL algorithm, such as the one described in Hanan Samet, *Connected Component Labeling Using Quadtrees*, Journal of the ACM (JACM), v.28 n.3, pp. 487-501, 1981. The resulting representation of object components is illustrated in FIG. 13B.

Figure 13C:
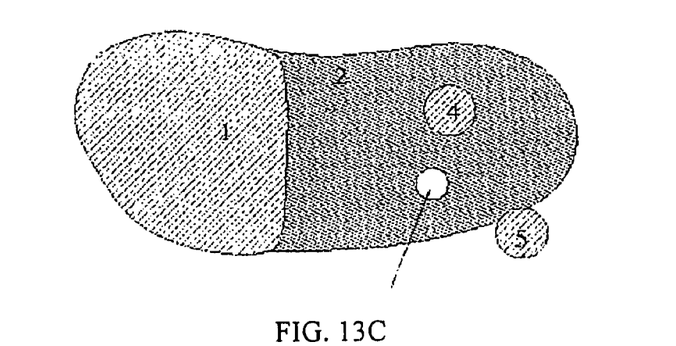
Figure 13D:
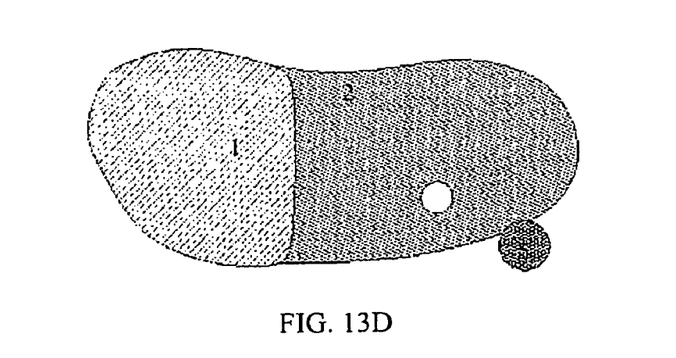

At step 1204, the number of voxels in each component is computed. Further, a threshold comparison component is configured to compare the number of voxels in each component to a threshold. For example, a threshold on the number of voxels can be determined by testing a variety of objects by subjecting them to similar scanning and compound object splitting. In another example, a threshold may be calculated based on certain variables associated with the system. It will be appreciated that the systems and techniques, described herein, are not limited to determining a threshold in any particular manner. Those skilled in the art may devise alternate methods for determining a threshold. If the number of voxels in a component is less than the threshold, the component is removed. The resulting representation of object components is illustrated in FIG. 13C. Alternatively, the component may be merged into one of its neighbors if the number of voxels is below the threshold.

The segmentation pruner 308 is further configured to merge distinct sub-objects having a connectivity ratio within a pre-determined connectivity threshold. At step 1206 through 1218, in one embodiment, connectivity of two or more sub-objects may be analyzed to determine whether undesirable separation occurred. In this embodiment, image data for segmentation smoothed sub-objects can be sent to a connectivity determiner 1206, which can be configured to determine a connectivity ratio of distinct sub-objects. In this example, the connectivity determiner 1206 can calculate a ratio of a number of connected surface voxels between respective sub-objects to the volume of the sub-object.

In the example embodiment, the connectivity merger 1208-1218 can further select pairs of sub-objects selected in some order, not limited to any particular order. For example, a first sub-object may be selected at 1208, followed by sequentially selecting other sub-objects to form a pair. The second sub-object may be selected next, followed by sequentially selecting other sub-objects to form a pair.

The connectivity merger can comprise a connectivity threshold comparison component step 1214, which can be configured to compare the connectivity ratio of the distinct sub-objects to a pre-determined connectivity threshold. For example, a threshold ratio for connection between sub-objects can be determined by testing a variety of objects by subjecting them to similar scanning and compound object splitting. In another example, a connectivity ratio threshold may be calculated based on certain variables associated with the system. It will be appreciated that the systems and techniques, described herein, are not limited to determining a connectivity ratio threshold in any particular manner. Those skilled in the art may devise alternate methods for determining a connectivity ratio threshold.

In this embodiment, the threshold comparison component 1214 can compare a connectivity ratio of distinct sub-objects to a connectivity ratio threshold to determine whether the sub-objects should be merged into one segmented object, or remain as separated sub-objects. For example, if a connectivity ratio of distinct sub-objects is greater than the connectivity ratio threshold, the connectivity merger 1216 can generate image data comprising a representation of merged sub-objects (e.g., the sub-objects can be merged back into a single segmented object). Otherwise, in this example, the connectivity merger 1216 can generate image data still comprising a representation of distinct sub-objects.

Still referring to FIG. 12, at step 1210, if all the sub-objects have been selected, the final number of sub-objects has been determined and the algorithm is completed. The resulting final representation of object components is illustrated in FIG. 13D. As seen in FIGS. 9B (original representation of object components) and 13D (final representation of object components), the image is processed to resolve mentioned irregularities of object boundaries to produce a more consistent representation of physically distinct object components.

Thus, the system and method including the histogram-based compound object separation technique as employed in the methods and systems described in the foregoing specification is constructed in accordance with the present invention. In particular, the present invention provides a new and improved method and system which provide the following improvements: threat segmentation quality is improved and automatic threat detection performance is improved. The exemplary embodiments described in this specification have been presented by way of illustration rather than limitation, and various modifications, combinations and substitutions may be effected by those skilled in the art without departure either in spirit or scope from this invention in its broader aspects and as set forth in the appended claims. The system and method employing the design of the present invention as disclosed herein, and all elements thereof, are contained within the scope of at least one of the following claims. No elements of the presently disclosed method and system are meant to be disclaimed.

What is claimed is:

1. A method of identifying sub-objects of an object defined as a plurality of volume elements (voxels) in an image generated by an imaging apparatus, each voxel being associated with a feature value (F), the method comprising:
   a. using a computer system, determining a distribution of feature values of object voxels so as to define an F distribution;
   b. using the computer system, identifying peaks and separation thresholds within the F distribution;
   c. using the computer system, deciding whether an object is a potential compound object;
   d. using the computer system, based on the separation thresholds, for each object voxel, assigning a sub-object label corresponding to the feature value associated with each voxel so as to distinguish the voxels for each of the sub-objects; and
   e. using the computer system, refining the sub-object label assignment so as to resolve inconsistencies in sub-object boundaries.

2. A method of claim 1, wherein the compound object splitting approach is used on an industrial luggage screening apparatus.

3. A method of claim 1, wherein the step of determining a distribution of feature values of object voxels includes the step of computing the distribution of feature values of object voxels so as define the F distribution.

4. A method of claim 1, wherein the step of determining a distribution of feature values of the object voxels includes the step of computing a histogram of the feature values so as to define the F distribution.

5. A method of claim 1, wherein the feature values of the object voxels includes the CT numbers of the object voxels.

6. A method of claim 1, further including a step of entry control so as initially determine whether the object appearing in the data set is an object that is potentially compound.

7. A method of claim 6, wherein the step of entry control includes the step of computing a histogram of the feature values if the object defined as a plurality of volume elements (voxels) in the image data is an object that is determined to be compound.

8. A method of claim 7, wherein the feature values are CT numbers, and the step of computing a histogram includes computing a CT number histogram.

9. A method of claim 7, wherein the peaks and valleys of the histogram are detected, and the step of entry control includes deciding whether to split the object into sub-objects as a function of at least one characteristic of the detected peaks.

10. A method of claim 9, wherein the CT number thresholds for the histogram are computed for the objects determined to be potential compound object.

11. A method of claim 1, wherein the image data for the objects determined to be potential compound object is thresholded using the CT number thresholds computed from the histogram, wherein the object is split into a number of sub-objects equal to the number of detected significant histogram peaks.

12. A method of claim 1, wherein the step of refining the sub-object label assignment includes resolving any inconsistencies in sub-object boundaries.

13. A method of claim 12, wherein the step of refining the sub-object label assignment includes reabsorbing any misclassified voxel patches into the dominant sub-object.

14. A method of claim 13, wherein reabsorbing any misclassified voxel patches into the dominant sub-object includes using a local neighborhood analysis.

15. A method of claim 1, wherein the step of refining includes modifying the sub-object label assignment of voxels representing the surfaces of each sub-object so that the surfaces are smooth.

16. A method of claim 15, wherein the step of modifying the sub-object label assignment includes reabsorbing any misclassified voxel patches into the dominant sub-object.

17. A method of claim 16, wherein reabsorbing any misclassified voxel patches into the dominant sub-object includes using a local neighborhood analysis.

18. A method of claim 1, wherein step of assigning a sub-object label to each object voxel based on the separation thresholds corresponding to the feature value associated with each voxel includes the step of connected component re-labeling of sub-objects.

19. A method of claim 1, wherein step of refining the sub-object label assignment so as to resolve inconsistencies in sub-object boundaries includes absorbing some of the sub-objects into other sub-objects based on their mutual connectivity.

20. A method of claim 19, wherein refining the sub-object label assignment so as to resolve inconsistencies in sub-object boundaries includes eliminating relatively small sub-objects.

21. A method of claim 19, wherein refining the sub-object label assignment so as to resolve inconsistencies in sub-object boundaries include performing a connectivity analysis.

22. A method of claim 19, wherein refining the sub-object label assignment so as to resolve inconsistencies in sub-object boundaries includes merging sub-objects that are substantially connected to one another.

23. A method of claim 19, wherein refining the sub-object label assignment so as to resolve inconsistencies in sub-object boundaries includes classifying at least some of the sub-objects as new objects.

24. A method of claim 1, wherein step of refining the sub-object label assignment so as to resolve inconsistencies in sub-object boundaries includes deletion of smaller sub-objects.

25. A computer-readable non-transitory storage medium containing computer executable instructions for performing the steps of:

determining a distribution of feature values of object voxels so as to define an F distribution;

assigning a sub-object label to each object voxel based on the separation thresholds corresponding to the feature value associated with each voxel in the F distribution so as to distinguish the voxels for each of the sub-objects; and refining the sub-object label assignment so as to resolve inconsistencies in sub-object boundaries.

26. A computer-readable non-transitory storage medium according to claim 25, containing computer executable instructions for performing the additional step of:

identifying peaks and separation thresholds within the F distribution prior to the step of assigning a sub-object label to each object voxel based on the separation thresholds corresponding to the feature value associated with each voxel in the F distribution so as to distinguish the voxels for each of the sub-objects.

* * * * *